US008912421B2

(12) United States Patent
Tanaka

(10) Patent No.: US 8,912,421 B2
(45) Date of Patent: Dec. 16, 2014

(54) CHORD-PLAYING INSTRUCTION DEVICE, CHORD-PLAYING INSTRUCTION METHOD, AND RECORDING MEDIUM

(71) Applicant: Casio Computer Co., Ltd., Tokyo (JP)

(72) Inventor: Takahiro Tanaka, Machida (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 14/223,859

(22) Filed: Mar. 24, 2014

(65) Prior Publication Data

US 2014/0283669 A1    Sep. 25, 2014

(30) Foreign Application Priority Data

Mar. 25, 2013  (JP) ................................. 2013-062206

(51) Int. Cl.
*G10H 1/38* (2006.01)
*G10H 7/00* (2006.01)
*G09B 15/08* (2006.01)

(52) U.S. Cl.
CPC ...................................... *G09B 15/08* (2013.01)
USPC .............................................. 84/637; 84/478

(58) Field of Classification Search
USPC ................... 84/613, 637, 477 R, 478
See application file for complete search history.

(56) References Cited

U.S. PATENT DOCUMENTS

| 5,524,522 | A  | * | 6/1996  | Hesnan ........................... 84/473 |
| 6,331,668 | B1 | * | 12/2001 | Michero ...................... 84/477 R |
| 7,825,320 | B2 | * | 11/2010 | Yatsui .............................. 84/613 |
| 8,492,636 | B2 | * | 7/2013  | Hara ............................... 84/613 |
| 2003/0051595 | A1 | * | 3/2003 | Hasegawa ....................... 84/637 |
| 2011/0247479 | A1 | * | 10/2011 | Helms et al. ................... 84/613 |

FOREIGN PATENT DOCUMENTS

JP     2005-084068 A    3/2005

* cited by examiner

*Primary Examiner* — Jeffrey Donels
(74) *Attorney, Agent, or Firm* — Holtz, Holtz, Goodman & Chick PC

(57) ABSTRACT

A chord-information storage stores chord-type information and information on relationship between constituent notes including a tonic of the chord as chord information. Upon specification of a tonic, a first instruction display reads out chord information, and then causes a display to show relationship information for a constituent note other than the tonic, chord-type information, and an indicator indicating positional relationship between the tonic and each constituent note on music-playing operators. Every time another note is specified after the tonic, a second instruction display extracts chord information including relationship information that matches with relationship between the specified tonic and all notes specified after the tonic, and causes the display to show relationship information of a constituent note other than the specified notes, chord-type information, and an indicator indicating positional relationship between the tonic and each constituent note on music-playing operators.

15 Claims, 14 Drawing Sheets

FIG. 2

| TYPE | READ AS | SIZE OF INTERVAL | NUMBER OF SEMITONES |
|---|---|---|---|
| X | MAJOR | 1·3·5 | 0,4,7 |
| Xm | MINOR | 1·♭3·5 | 0,3,7 |
| X6 | SIXTH | 1·3·5·6 | 0,4,7,9 |
| Xm6 | MINOR SIXTH | 1·♭3·5·6 | 0,3,7,9 |
| X7 | SEVENTH | 1·3·5·♭7 | 0,4,7,10 |
| Xm7 | MINOR SEVENTH | 1·♭3·5·♭7 | 0,3,7,9,10 |
| XY7 | MAJOR SEVENTH | 1·3·5·7 | 0,4,7,11 |
| XmY7 | MINOR MAJOR SEVENTH | 1·♭3·5·7 | 0,3,7,11 |
| X9 | NINTH | 1·3·5·♭7·9 | 0,4,7,10,14 |
| Xm9 | MINOR NINTH | 1·♭3·5·♭7·9 | 0,3,7,10,14 |
| Xadd9 | ADDED NINTH | 1·3·5·9 | 0,4,7,14 |
| X69 | SIXTH NINTH | 1·3·5·6·9 | 0,4,7,9,14 |
| Xsus4 | SUSPENDED FOUR | 1·4·5 | 0,5,7 |
| X7sus4 | SEVENTH SUSPENDED FOUR | 1·4·5·♭7 | 0,5,7,10 |
| Xsus2 | SUSPENDED TWO | 1·2·5 | 0,2,7 |
| Xsus9 | SUSPENDED NINTH | 1·4·5·♭7·9 | 0,5,7,10,14 |
| Xaug | AUGMENTED | 1·3·♯5 | 0,4,8 |
| Xaug7 | AUGMENTED SEVENTH | 1·3·♯5·♭7 | 0,4,8,10 |
| Xalt | ALTERED | 1·3·♭5 | 0,4,6 |
| X7♭5 | SEVENTH FLAT FIFTH | 1·3·♭5·♭7 | 0,4,6,10 |
| Xm7♭5 | MINOR SEVENTH FLAT FIFTH | 1·♭3·♭5·♭7 | 0,3,6,10 |
| X9+5 | AUGMENTED NINTH | 1·3·♯5·♭7·9 | 0,4,8,10,14 |
| X9-5 | ALTERED NINTH | 1·3·♭5·♭7·9 | 0,4,6,10,14 |
| X7+9 | SEVENTH SHARP NINTH | 1·3·5·♭7·♯9 | 0,4,7,10,15 |
| X7-9 | SEVENTH FLAT NINTH | 1·3·5·♭7·♭9 | 0,4,7,10,13 |
| Xadd9 | ADDED NINTH | 1·3·5·9 | 0,4,7,14 |
| Xm-5 | DIMINISHED TRIAD | 1·♭3·♭5 | 0,3,6 |
| Xdim | DIMINISHED | 1·♭3·♭5·♭♭7 | 0,3,6,9 |
| XdimY7 | DIMINISHED MAJOR SEVENTH | 1·♭3·♭5·7 | 0,3,6,11 |
| Xdim9 | DIMINISHED NINTH | 1·♭3·♭5·♭♭7·9 | 0,3,6,9,14 |

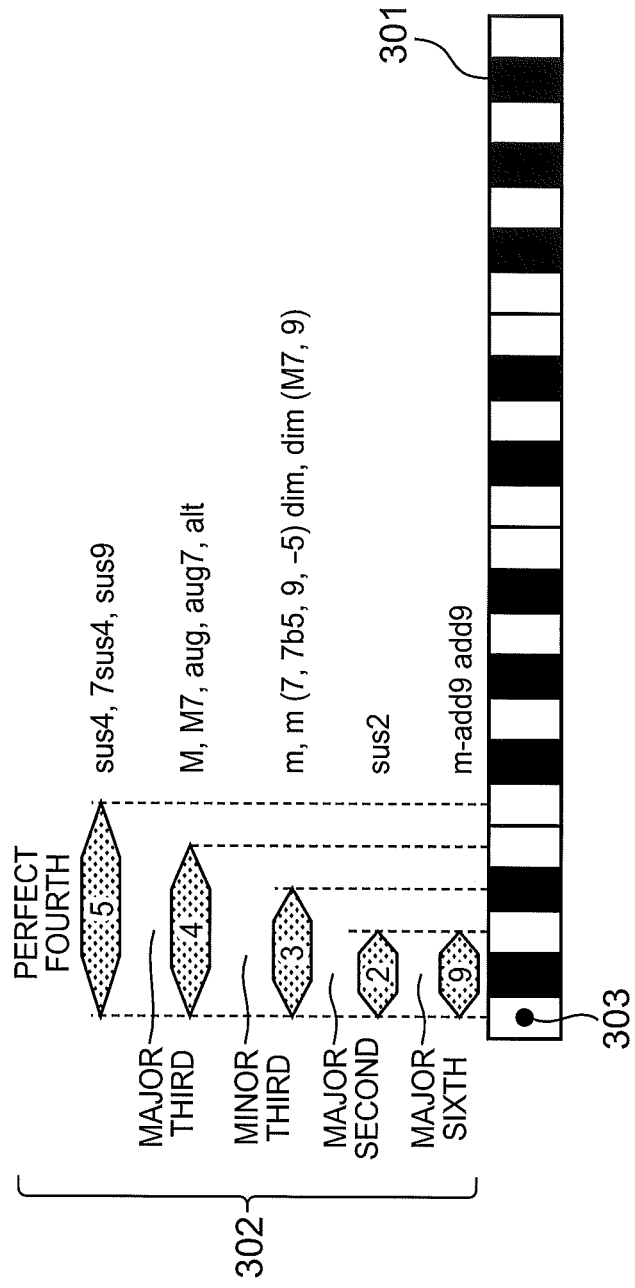

CHORD-PLAYING INSTRUCTION DEVICE, CHORD-PLAYING INSTRUCTION METHOD, AND RECORDING MEDIUM

CROSS-REFERENCE TO RELATED APPLICATION

This application is based upon and claims the benefit of priority from the prior Japanese Patent Application No. 2013-062206, filed Mar. 25, 2013, and the entire contents of which are incorporated herein by reference.

FIELD

The present invention relates to a device, a method, and a recording medium for providing instruction in playing chords on a keyboard instrument.

BACKGROUND

One of the difficulties that beginners of a musical instrument face is learning how to play chords. Especially in playing a keyboard instrument, when a player wants to play chords that are different in tonality, the player needs to arrange a pressing form of chords, in other words, form of player's fingers to press keys in completely different ways, since the keyboard instrument has black keys and white keys. Such complications make learning chords difficult.

Some conventional techniques have been proposed that enable players who do not know anything about sheet music of a keyboard instrument to visually remember chords as patterns. For example, Unexamined Japanese Patent Application Kokai Publication No. 2005-84068 discloses a technique for sequentially showing circularly-arranged notes constituting one octave of a keyboard, and showing constituent notes of a target chord so as to be distinguishable from the other constituent notes.

However, the above-described conventional technique has a problem of requiring time for users to convert the circular arrangement of the notes to arrangement of a keyboard in users' heads. In addition, the technique also has a problem that only one chord can be shown at a time. For this reason, users cannot understand relationship between a major chord (major), a minor chord (minor), a seventh chord (seventh), a suspended-second chord (sus2), a suspended-fourth chord (sus4), an added-ninth chord (add9), and the like, even though the users can understand pitches corresponding to each chord.

SUMMARY

The objective of the present invention is to provide a chord-playing instruction device, a chord-playing instruction method, and a recording medium that make it possible even for beginners to play a keyboard instrument without difficulty by looking at a chord sheet, thereby facilitating acquiring of chord-playing skills.

A chord-playing instruction device according to the present invention comprises: a chord-information storage for storing, for each chord type, chord-type information on a type of chord and relationship information indicating relationship between constituent notes including a tonic of the chord, as a set of chord information; a display controller for causing a display to show multiple music-playing operators arranged sequentially; a first instruction display for reading out a corresponding one of the sets of chord information stored in the chord-information storage when a tonic of a chord is specified, and then causing the display to show the relationship information related to constituent notes other than the tonic, in the read-out set of chord information, the chord-type information, and an indicator that indicates positional relationship between the tonic and constituent notes other than the tonic on the music-playing operators, based on a position of the specified tonic; and a second instruction display for extracting one of the sets of chord information including relationship information that matches with relationship between the specified tonic and all notes specified subsequently to the tonic, from the chord-information storage, every time a different note is specified after specification of the tonic, and causing the display to show the relationship information related to constituent notes other than the specified notes, in the extracted set of chord information, the chord-type information, and an indicator that indicates positional relationship between the tonic and constituent notes other than the specified constituent notes on the music-playing operators, based on the position of the specified tonic.

The present invention makes it possible even for beginners to play chords on a keyboard instrument without difficulty by looking at a chord sheet, which facilitates acquiring of chord-playing skills.

BRIEF DESCRIPTION OF THE DRAWINGS

A more complete understanding of this application can be obtained when the following detailed description is considered in conjunction with the following drawings, in which:

FIG. 2 is a table showing an example of configuration of chord information stored in a chord-information storage;

FIG. 3 is a diagram illustrating a chord-playing instruction process in a normal mode (Part 1);

DETAILED DESCRIPTION

In the following, an embodiment of the present invention will be described in detail with reference to the drawings.

Figure 1:
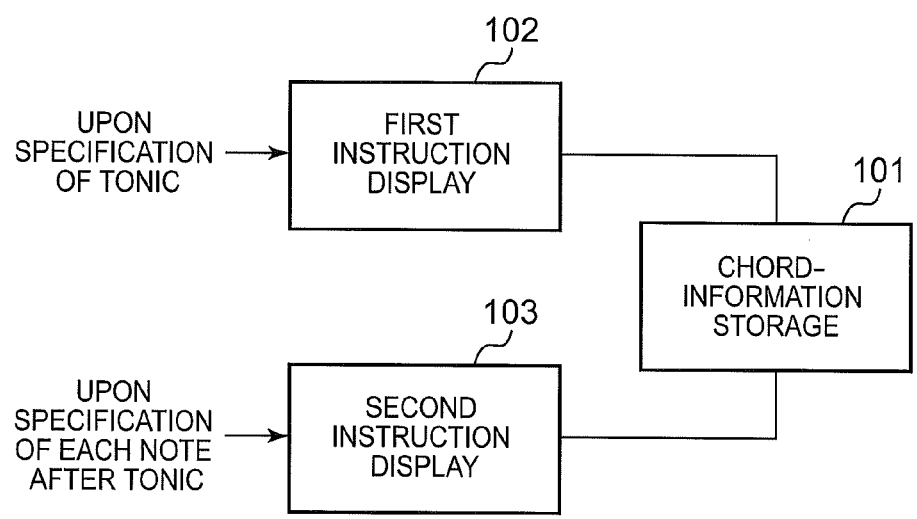
FIG. 1 is a diagram illustrating a configuration of a chord-playing instruction device.

FIG. 1 is a diagram showing a configuration of a chord-playing instruction device 100 according to the present embodiment.

A chord-information storage 101 stores, for each chord type, a chord type, and a size of interval from the tonic to each of the constituent notes of the corresponding chord including the tonic, or the number of semitones from the tonic to each of the constituent notes, as a set of chord information.

Upon receipt of an input (key press) for specifying a tonic of an arbitrary chord from a user, a first instruction display 102 extracts appropriate sets of chord information from the chord-information storage 101, as first chord candidates. Then, for each first chord candidate, the first instruction display 102 shows, in association with an image representing a keyboard: the smallest interval or the smallest number of semitones, among those included in the first chord candidate, other than that of the tonic; a chord type; and a position corresponding to the size of interval or the number of semitones based on the position of the specified tonic.

Upon receipt of one or more inputs (key presses) each for specifying another note from the user after the input for specifying the tonic, a second instruction display 103 extracts sets of chord information each including the size of interval or the number of semitones from the tonic to each of the notes that have been specified until now, as second chord candidates by referring to the chord information stored in the chord-information storage 101. Then, for each of the second chord candidates, the second instruction display 103 shows, in association with an image representing a keyboard: the size of interval or the number of semitones that is next largest to the largest interval or the largest number of semitones among those that have been specified until now and included in the second chord candidate; a chord type; and a position corresponding to the size of interval or the number of semitones based on the position of the specified tonic.

FIG. 2 is a table showing an example of a configuration of chord information stored in the chord-information storage 101. The chord-information storage 101 stores, for each chord type, a chord type, a size of interval from a tonic of the chord to each of constituent notes including the tonic, and the number of semitones from the tonic to each of the constituent notes, as a set of chord information. The chord information may also include information on how to read a name of each chord type. Each "X" in the table is to be substituted by a symbol representing a musical scale such as C, D, E, F, G, A, or B, or one of these symbols with a sharp or a flat.

In FIG. 2, for example, a chord of the type "X" is read as "major", and has a "major first", a "major third", and a "major fifth" as sizes of intervals from a tonic to three respective constituent notes including the tonic, while having "0", "4", and "7" as the numbers of semitones from the tonic to the three respective constituent notes. A note having a major-first interval and "0" as the number of semitones indicates a tonic.

A chord of the type "Xm" is read as "minor", and has a "major first", a "minor third (flat 3)", and a "major fifth" as sizes of intervals from a tonic to three respective constituent notes including the tonic, while having "0", "3", and "7" as the numbers of semitones from the tonic to the three respective constituent notes.

A chord of the type "Xaug" is read as "augmented", and has a "major first", a "major third", and an "augmented fifth (sharp 5)" as sizes of intervals from a tonic to three respective constituent notes including the tonic, while having "0", "4", and "8" as the numbers of semitones from the tonic to the three respective constituent notes.

The same principle also applies to other chords even when a chord includes four or more constituent notes. Additionally, the chord-information storage 101 may also store absolute pitch of each of constituent notes included in each chord with respect to a predetermined root (for example, C).

Next, a process carried out by the chord-playing instruction device 100 according to the present embodiment will be described by referring to FIGS. 3 to 9.

FIG. 3 illustrates an example of a configuration of a screen shown by the chord-playing instruction device 100 connected to an electronic keyboard instrument. In a chord-playing instruction mode, a display of the chord-playing instruction device 100 shows a keyboard 301 of two octaves, for example.

On the keyboard 301, black keys and white keys are represented by figures of the same size, and are aligned horizontally in the same order as in an actual keyboard. In the embodiment, since the black keys and white keys are shown in the same size, users can easily understand relationship of interval between constituent notes of each chord.

FIG. 3 represents a screen shown when a user presses "C" as a tonic, among keys of the electronic keyboard instrument. A press mark 303 for indicating that a tonic has been pressed is shown at a position of the note "C" on the keyboard 301.

Upon receipt of an input (key press) for specifying a tonic of an arbitrary chord from a user, the first instruction display 102 extracts, as first chord candidates, sets of chord information having the configuration shown in FIG. 2, from the chord-information storage 101.

Here, if a user does not specify any condition, the first instruction display 102 extracts sets of chord information in all rows (30 sets of chord information, in FIG. 2) from the chord-information storage 101. Alternatively, the first instruction display 102 may extract only particular sets of chord information, based on a priority order determined by a user in advance.

For example, by determining a user's skill level of playing chords on the basis of the user's key-press record, the first instruction display 102 may extract only sets of chord information estimated to be easy for the user, without extracting sets of chord information estimated to be difficult for the user, extract only sets of chord information including the number of notes less than or equal to a predetermined number, or extract only predetermined sets of chord information.

Then, the first instruction display 102 shows, for each of the extracted first chord candidates, the smallest interval or the smallest number of semitones among those of notes included in the first chord candidate excluding the tonic (size of interval or the number of semitones between the tonic and a note closest to the tonic), a chord type, and a position corresponding to the size of interval or the number of semitones based on the position of the pressed tonic "C," in association with the keyboard 301, as shown in a chord-mark group 302.

In the chord-mark group 302, chords represented by "M" (major), "M7" (major seventh), "aug" (augmented), "aug7" (augmented seventh), and "alt" (altered) among chords shown as first chord candidates, correspond respectively to chords represented by chord types "X", "XY7", "Xaug", "Xaug7", and "Xalt", indicated in FIG. 2. The smallest interval after a "major first," which is the size of interval of the tonic, is a "major third" for all the above chords. In addition, the smallest number of semitones after "0" which is the number of semitones of the tonic, is "4" for all the above chords.

Accordingly, the first instruction display 102 shows a chord mark (having a shape of hexagon in this embodiment) extending rightward by four keys corresponding to the number of semitones "4" given above, from the position of the tonic "C" indicated by the press mark 303 on the keyboard 301. Moreover, the first instruction display 102 shows the number of semitones "4" inside the chord mark, while showing the size of interval "major third" above the chord mark. Further, the first instruction display 102 shows the chord types "M, M7, aug, aug7, alt" together on the right side of the chord mark.

In this way, a user can easily understand that a note to be played when the fourth white key to the right from the tonic "C" is pressed is a constituent note having the lowest pitch next to the tonic, for the chord types "M, M7, aug, aug7, alt".

The same principle applies to the other first chord candidates.

Figure 4:
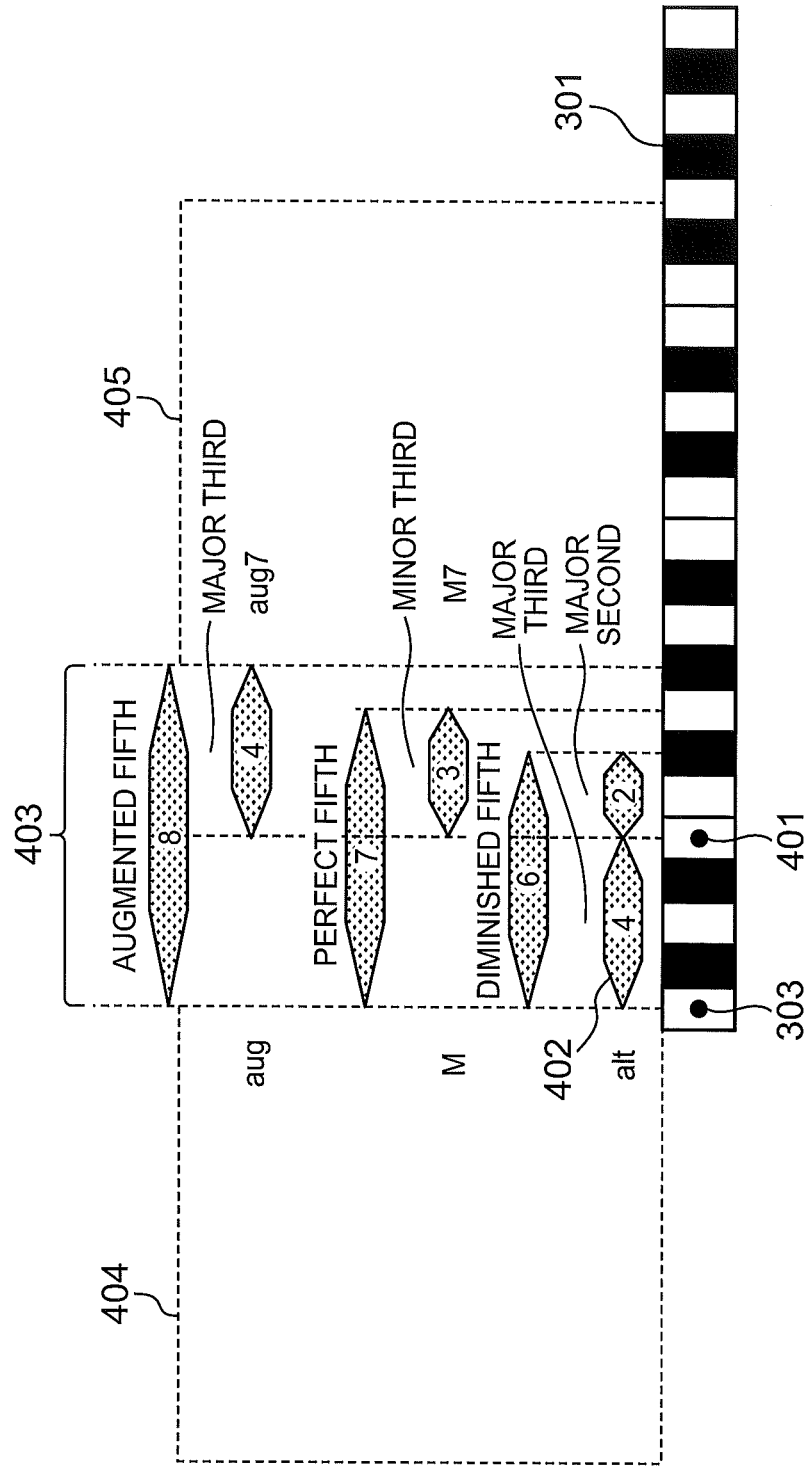
FIG. 4 is a diagram illustrating the chord-playing instruction process in the normal mode (Part 2)

Similarly to FIG. 3, FIG. 4 illustrates an example of a configuration of a screen shown by the chord-playing instruction device 100 connected to the electronic keyboard instrument. As in FIG. 3, the display shows a keyboard 301 of two octaves, for example, in the chord-playing instruction mode.

FIG. 4 represents a configuration of a screen shown when the user further presses a note "E" having a major-third interval from the tonic by looking at the chord types "M, M7, aug, aug7, alt" after pressing a note "C" as the tonic among keys of the electronic keyboard instrument, in a state illustrated in FIG. 3. A press mark 401, which is the second press mark, is additionally shown at the position of the note "E" on the keyboard 301. Here, the first press mark 303 is shown as in FIG. 3.

Then, by referring to the chord information having the configuration shown in FIG. 2, the second instruction display 103 extracts, as second chord candidates, sets of chord information each including sizes of intervals, "1" (major first) and "3" (major third) or the numbers of semitones, "0" and "4", corresponding to the notes "C" and "E," which have been pressed until now, based on the tonic "C" pressed by the user.

The second instruction display 103 carries out, for example, a process for excluding chord types such as a sixth type and a ninth type to extract chords "M", "M7", "aug", "aug7", and "alt" as second chord candidates.

The second instruction display 103 then shows the size of interval or the number of semitones from the tonic, which is pressed first, to the note, which is pressed second, and a position corresponding to the size of interval or the number of semitones based on the position of the pressed tonic, in association with the keyboard 301.

For example, as shown in FIG. 4, the second instruction display 103 shows a chord mark 402 extending rightward by four keys and indicating a major-third interval (four semitones) from the tonic "C," which is pressed first, to the note "E," which is pressed second, in association with the keyboard 301. Moreover, the second instruction display 103 shows the number of semitones "4" inside the chord mark 402, while showing the size of interval from the tonic, "major third", above the chord mark 402.

Further, the second instruction display 103 shows, for each of the second chord candidates, a size of interval or the number of semitones that is next largest to that of the constituent note "E," which has the largest interval "major third" or the largest number of semitones "4", among those of notes that are included in the second chord candidate and have been pressed until now, and a position corresponding to the size of interval or the number of semitones based on the position of the pressed tonic "C", in association with the keyboard 301, as shown in a chord-mark group 403.

For example, the second instruction display 103 shows a chord mark extending rightward by eight keys corresponding to the number of semitones "8", from the position of the pressed tonic "C" on the keyboard 301. Moreover, the second instruction display 103 shows the number of semitones "8" inside the chord mark while showing the size of interval from the tonic, "augmented fifth", above the chord mark.

Further, the second instruction display 103 shows a chord mark extending rightward by four keys corresponding to the number of semitones "4", from the position of note "E", which is pressed second, on the keyboard 301. The second instruction display 103 shows the number of semitones "4", inside the chord mark while showing the size of interval from the note, which is pressed second, "major third", above the chord mark.

Similarly to the above, the second instruction display 103 shows, as other second chord candidates, a chord mark indicating a perfect-fifth interval (seven semitones), a chord mark indicating a minor-third interval (three semitones), a chord mark indicating a diminished-fifth interval (six semitones), and a chord mark indicating a major-second interval (two semitones).

The second instruction display 103 classifies a chord type, for each of the second chord candidates, and shows the chord type in a left area 404 or a right area 405 accordingly.

On the basis of the chord information shown in FIG. 2, the second instruction display 103 shows, in the left area 404, chord types "M", "aug", and "alt", each of which has only three constituent notes including a third note to be pressed next. By contrast, the second instruction display 103 shows, in the right area 405, chord types "M7" and "aug7", each of which has four or more constituent notes and includes at least a fourth note in addition to the third note to be pressed next.

More specifically, the second instruction display 103 shows, in the left area 404, a chord type "aug" consisting of the tonic "C", which is pressed first, the note "E," which is pressed second, and a third note corresponding to a chord mark indicating a major-third interval (four semitones).

In addition, the second instruction display 103 shows, in the right area 405, a chord type "aug7" consisting of four notes including the tonic "C", which is pressed first, the note "E", which is pressed second, and the third note corresponding to the above-described chord mark, as an indication related to the third note corresponding to the chord mark indicating a major-third interval (four semitones) which is the same as for the chord type "aug". If the second chord candidates include other chords each consisting of four or more constituent notes, the second instruction display 103 may also show the chords in the right area 405.

Similarly, the second instruction display 103 shows, in the left area 404, a chord type "M" consisting of the pressed tonic "C", the note "E", which is pressed second, and a third note corresponding to a chord mark indicating a minor-third interval (three semitones).

In addition, the second instruction display 103 shows, in the right area 405, a chord type "M7", which consists of four notes including the tonic "C", which is pressed first, the note "E", which is pressed second, and the third note corresponding to the above-described chord mark as an indication related to the third note corresponding to the chord mark indicating minor third (three semitones) which is the same as for the chord type "M". If the second chord candidates include other chords each consisting of four or more constituent notes, the second instruction display 103 may also show the chords in the right area 405.

Further, the second instruction display 103 shows, in the left area 404, a chord type "alt" consisting of the tonic "C", which is pressed first, the note "E", which is pressed second, and a third note corresponding to a chord mark indicating a major-second interval (two semitones). In this case, however, since the second chord candidates do not include any chord type consisting of four or more notes related to the chord mark indicating a major-second interval (two semitones) which is the same as for the chord type "alt", the second instruction display 103 does not show any chord type in the right area 405.

By looking at the screen shown as described above, the user can easily understand how to play chords.

Figure 5:
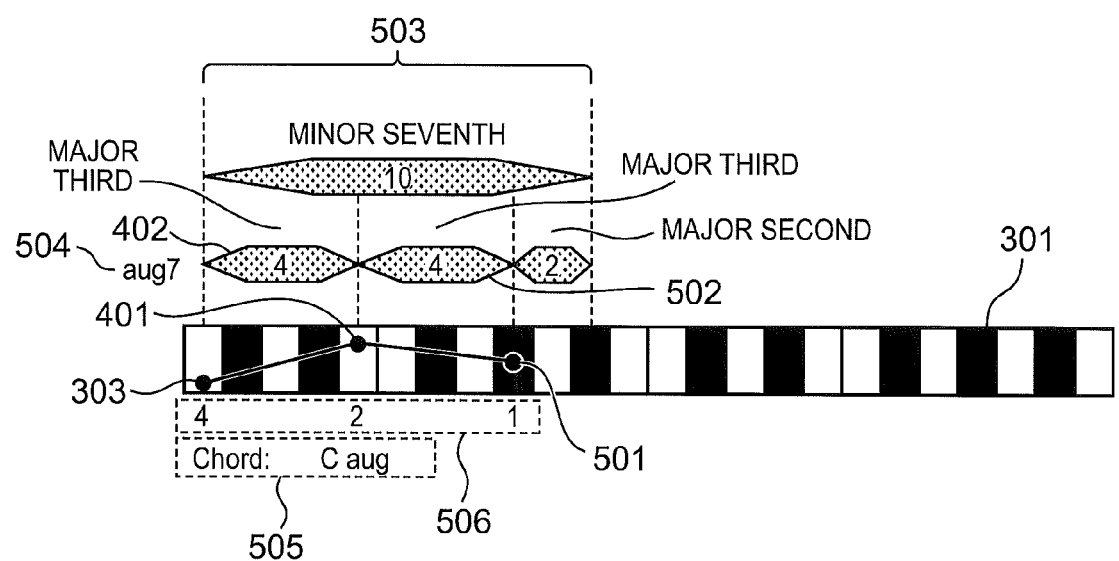
FIG. 5 is a diagram illustrating the chord-playing instruction process in the normal mode (Part 3)

Similarly to FIGS. 3 and 4, FIG. 5 illustrates an example of a configuration of a screen shown by the chord-playing instruction device 100 connected to the electronic keyboard instrument. In the chord-playing instruction mode, the display shows the keyboard 301 of two octaves, for example, as in FIGS. 3 and 4.

FIG. 5 illustrates a configuration of a screen shown when the user presses, as a third note, a note "G sharp", which has an augmented fifth interval (eight semitones) from the tonic (that is, a major-third interval (four semitones) from the note which is pressed second), by looking at the chord type "aug" or "aug7" shown as in FIG. 4, after pressing the notes "C" and "E" among keys of the electronic keyboard instrument. A press mark 501 is additionally shown at the position of the note "G sharp" on the keyboard 301. Here, the press marks 303 and 401 are shown as in FIG. 4.

By referring to the chord information having the configuration shown in FIG. 2, the second instruction display 103 extracts, as second chord candidates, sets of chord information each including sizes of intervals, "1" (major first), "3" (major third), and "sharp 5" (augmented fifth), or the numbers of semitones, "0", "4", and "8", corresponding to the notes "C", "E", and "G sharp", which have been pressed until now, based on the pressed tonic "C".

The second instruction display 103 carries out, for example, a process for excluding chord types such as a sixth type and a ninth type to extract chords, "aug" and "aug7", as second chord candidates.

Then, the second instruction display 103 shows the size of interval or the number of semitones from the tonic, which is pressed first, to the note, which is pressed second, at a position corresponding to the size of interval or the number of semitones based on the position of the pressed tonic, in association with the keyboard 301. Similarly, the second instruction display 103 shows the size of interval or the number of semitones from the note which is pressed second to the note which is pressed third, at a position corresponding to the size of interval or the number of semitones based on the position of the note which is pressed second.

In FIG. 5, the second instruction display 103 shows a chord mark 402 indicating a major-third interval (four semitones) from the tonic "C" which is pressed first to the note "E" which is pressed second, and a chord mark 502 indicating a major-third interval (four semitones) from the note "E" which is pressed second to the note "G sharp" which is pressed third, in association with the keyboard 301.

Further, the second instruction display 103 shows, for each of the second chord candidates, a size of interval or the number of semitones that is next largest to the largest interval "sharp 5" (augmented fifth), or the largest number of semitones "8" of the constituent note "G sharp" among those of notes that are included in the second chord candidate and have been specified until now, a chord type, and a position corresponding to the size of interval or the number of semitones based on the position of the specified tonic "C", in association with the keyboard 301, as shown in a chord-mark group 503.

Specifically, the second instruction display 103 shows a chord mark extending rightward by ten keys corresponding to the number of semitones "10" from the position of the tonic "C" which is pressed first, on the keyboard 301. Moreover, the second instruction display 103 shows the number of semitones "10" inside the chord mark while showing the size of interval from the tonic, "minor seventh", above the chord mark.

The second instruction display 103 also shows a chord mark extending rightward by two keys corresponding to the number of semitones "2" from the position of the note "G sharp" which is pressed third, on the keyboard 301. The second instruction display 103 shows the number of semitones "2" inside the chord mark while showing the size of interval from the note which is pressed third, "major second", above the chord mark.

On the basis of the chord information shown in FIG. 2, the second instruction display 103 shows a chord type 504, "aug7", which consists of four constituent notes including a fourth note to be specified next, on the left side of the chord-mark group 503.

Moreover, on the basis of the chord information shown in FIG. 2, when a chord is formed with relationship of size of interval (the number of semitones) between three notes that have been pressed, the second instruction display 103 shows a corresponding chord name based on the current tonic.

For example, in FIG. 5, three pressed notes "C", "E", and "G sharp" respectively have "major first" (zero semitone), "major third" (four semitones), and "augmented fifth" (eight semitones) as the sizes of intervals (the numbers of semitones) from the tonic. On the basis of the chord information shown in FIG. 2, relationship between these three notes corresponds to a chord type "Xaug". In addition, since the tonic is "C", the second instruction display 103 determines that the current chord name is "Caug". Thereby, the second instruction display 103 shows the chord name 505, "Chord: Caug". In this way, the user can find out the chord name corresponding to three notes that the user has pressed.

Furthermore, when a chord is formed with three pressed notes, the second instruction display 103 may determine appropriate fingering corresponding to the chord and show a fingering instruction 506 corresponding to the determined fingering.

For example, in FIG. 5, the second instruction display 103 shows the fingering instruction 506 indicating "4" (left ring finger), "2" (left index finger), and "1" (left thumb) corresponding respectively to three pressed notes "C", "E", and "G sharp". Alternatively, the second instruction display 103 may show a fingering instruction indicating fingering numbers for right hand.

As a method for showing the fingering instruction 506, a technique disclosed in Japanese Patent No. 4301125 may be employed, for example.

Similarly to FIGS. 3 to 5, FIG. 6 illustrates an example of a configuration of a screen shown by the chord-playing instruction device 100 connected to the electronic keyboard instrument. In the chord-playing instruction mode, the display shows a keyboard 301 of two octaves, for example, as in FIGS. 3 to 5.

Figure 6:
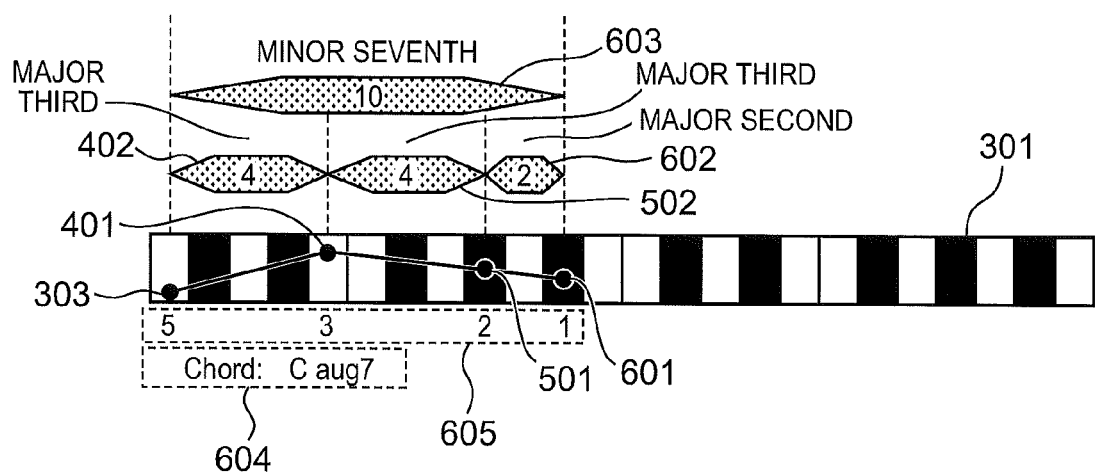
FIG. 6 is a diagram illustrating the chord-playing instruction process in the normal mode (Part 4)

FIG. 6 represents a configuration of a screen shown when the user presses, as a fourth note, a note "A sharp", which has a minor-seventh interval (ten semitones) from the tonic (that is, a major-second interval (two semitones) from the note pressed third), by looking at a chord type "aug7" shown as indicated in FIG. 5, after pressing "C", "E", and "G sharp" among keys of the electronic keyboard instrument. A press mark 601 is additionally shown at a position of "A sharp" on the keyboard 301. Here, the press marks 303, 401, and 501 are shown as in FIG. 5.

On the basis of the chord information having the configuration exemplified in FIG. 2, the second instruction display 103 extracts, as second chord candidates, sets of chord information each including sizes of intervals, "1" (a major first), "3" (a major third), "sharp 5" (an augmented fifth), and "flat 7" (a minor seventh), or the numbers of semitones, "0", "4", "8", and "10" of the corresponding notes "C", "E", "G sharp", and "A sharp", which have been pressed until now, based on the pressed tonic "C."

The second instruction display 103 carries out, for example, a process for excluding chord types such as a sixth type and a ninth type to extract a chord type "aug7" as a second chord candidate.

The second instruction display 103 shows the size of interval or the number of semitones from the tonic which is pressed first to the note which is pressed second, at a position corresponding to the size of interval or the number of semitones based on the position of the pressed tonic, in association with the keyboard 301. Moreover, the second instruction display 103 shows the size of interval or the number of semitones from the note which is pressed second to the note which is pressed third, at a position corresponding to the size of interval or the number of semitones based on the position of the note which is pressed second. Furthermore, the second instruction display 103 shows the size of interval or the number of semitones from the note which is pressed third to the note which is pressed fourth, at a position corresponding to the size of interval or the number of semitones based on the position of the note which is pressed third.

For example, in FIG. 6, the second instruction display 103 shows a chord mark 402 indicating a major-third interval (four semitones) from the tonic "C" which is pressed first to the note "E" which is pressed second, in association with the keyboard 301. The second instruction display 103 shows a chord mark 502 indicating a major-third interval (four semitones) from the note "E" which is pressed second to the note "G sharp" which is pressed third, in association with the keyboard 301. The second instruction display 103 shows a chord mark 602 indicating a major-second interval (two semitones) from the note "G sharp" which is pressed third to the note "A sharp" which is pressed fourth, in association with the keyboard 301. The second instruction display 103 shows a chord mark 603 indicating a minor-seventh interval (ten semitones) from the tonic "C" which is pressed first to the note "A sharp" which is pressed fourth, in association with the keyboard 301.

Here, the chord information shown in FIG. 2 does not include any chord type including the size of interval or the number of semitones that is next largest to the largest interval "flat 7" or the largest number of semitones "10" among those included in the second chord candidates and corresponding to the notes that have been pressed until now, as well as including still another constituent note. For this reason, the second instruction display 103 does not show any candidate for a chord type that can be formed by still another key press.

Note that, in this embodiment, chords to be shown are narrowed down by carrying out, for example, a process for excluding chord types such as a sixth type and a ninth type, as described above. For example, complicated chords such as an augmented-ninth chord are not shown.

Moreover, when a chord is formed with relationship of size of interval (the number of semitones) between the pressed four notes, by referring to the chord information shown in FIG. 2, the second instruction display 103 shows a corresponding chord name based on the current tonic.

For example, in FIG. 6, four pressed notes "C", "E", "G sharp", and "A sharp" respectively have "major first" (zero semitone), "major third" (four semitones), "augmented fifth" (eight semitones), and "minor seventh" (ten semitones) as the sizes of intervals (the numbers of semitones) from the tonic. On the basis of the chord information shown in FIG. 2, relationship between these notes corresponds to the chord type "Xaug7". Since the tonic is "C", the second instruction display 103 determines that the current chord name is "Caug7". Thereby, the second instruction display 103 shows a chord name 604, "Chord: Caug7". In this way, the user can find out the chord name corresponding to four notes that the user has pressed.

Furthermore, when a chord is formed with the four pressed notes, the second instruction display 103 may determine appropriate fingering corresponding to the chord and show a fingering instruction 605 corresponding to the determined fingering.

For example, in FIG. 6, the second instruction display 103 shows the fingering instruction 605 indicating "5" (left little finger), "3" (left middle finger), "2" (left index finger), and "1" (left thumb) corresponding respectively to four pressed notes "C", "E", "G sharp", and "A sharp".

Figure 7:
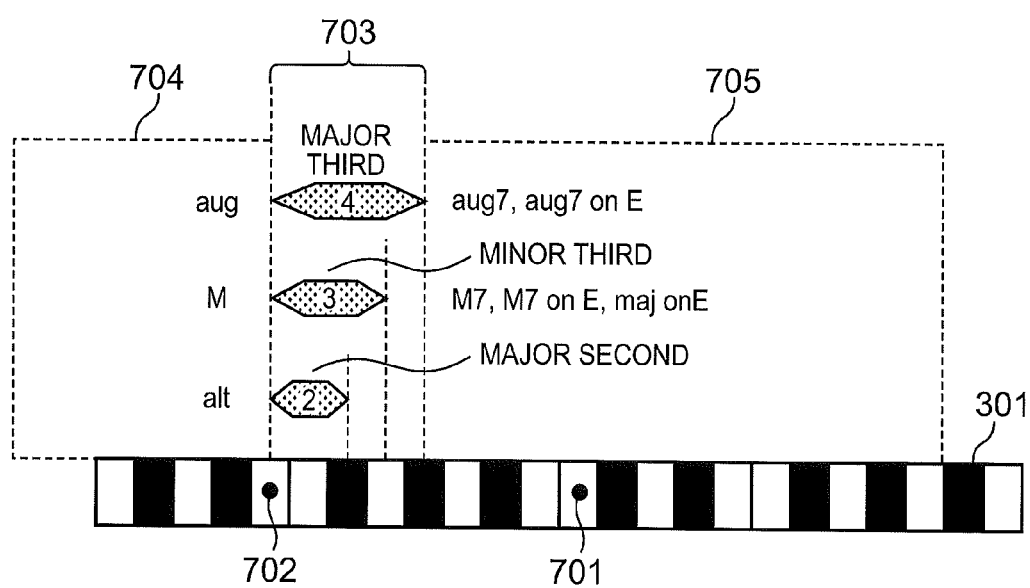
FIG. 7 is a diagram illustrating the chord-playing instruction process in an inversion mode (Part 1)

FIG. 7 shows an example of a configuration of a screen shown in an inversion mode by the chord-playing instruction device 100 connected to the electronic keyboard instrument. As in FIGS. 3 to 6, the display shows a keyboard 301 of two octaves, for example.

FIG. 7 illustrates a screen shown when a user presses a note "E", which has a major-third interval from the tonic, in the octave lower than the tonic "C", by looking at chord types "M, M7, aug, aug7, alt" shown as indicated in FIG. 3, after pressing the note "C" as the tonic among keys of the electronic keyboard instrument. This state corresponds to so-called inversion. On the second instruction display 103, a press mark 701 indicating the tonic "C" is moved to a position one octave higher, and a press mark 702 is shown at a position of the note "E", one octave lower than the position of the press mark 701, on the keyboard 301. Alternatively, when the note "E", which is one octave lower than the tonic "C" is pressed, the second instruction display 103 may extend the keyboard 301 leftward and show the press mark 702 at a position of the note "E" on the leftward-extended part of the keyboard 301 without changing the position of the tonic.

The second instruction display 103 refers to the chord information having the configuration shown in FIG. 2. As in the case shown in FIG. 4, the second instruction display 103 extracts, as second chord candidates, sets of chord information each including the sizes of intervals "1" (major first) and "3" (major third), or the numbers of semitones "0" and "4", corresponding to the respective notes "C" and "E", which have been specified until now, based on the specified tonic "C".

At this stage, the second instruction display 103 searches the chord information shown in FIG. 2 by assuming that the note "C", which is pressed first, is the tonic and the notes "C" and "E" are those having a major-third interval (four semitones) therebetween, while ignoring that the note "E" is the octave lower than the note "C". The second instruction display 103 carries out, for example, a process for excluding chord types such as a sixth type and a ninth type, to extract chord types "M", "M7", "aug", "aug7", and "alt" as second chord candidates.

When the inversion mode is selected, the second instruction display 103 sets, for each of the second chord candidates, the note "E", which is the lowest pitch among those included in the second chord candidate and specified until now excluding the tonic "C", to be a bass note. Then, the second instruction display 103 shows a constituent note having a size of interval or the number of semitones that is next larger than that of the bass note, and a position corresponding to the size of interval or the number of semitones based on the position of the specified bass note "E", in association with the keyboard 301.

For example, in FIG. 7, the second instruction display 103 shows a chord mark extending rightward by four keys corresponding to the number of semitones "4" from the position of the bass note "E", on the keyboard 301. The second instruction display 103 shows the number of semitones "4" inside the chord mark, while showing the size of interval from the note, which is pressed second, "major third", above the chord mark.

Similarly, the second instruction display 103 shows, as other second chord candidates, a chord mark indicating a minor-third interval (three semitones) and a chord mark indicating a major-second interval (two semitones).

As in the case shown in FIG. 4, when showing sizes of intervals or the numbers of semitones and chord types, the second instruction display 103 classifies, for each of the second chord candidates, a chord type on the basis of the number of constituent notes of the chord and shows the chord type in a left area 704 or a right area 705, accordingly. In other words, the second instruction display 103 shows, in the left area 704, chord types "M", "aug", and "alt", each of which is to be completed as a chord with a next specified note, and, in the right area 705, chord types, such as "M7" "M7 on E", "aug7", and "aug7 on E", each of which requires two or more notes to be specified, that is, chord types that are not yet to be completed as a chord even when another note is pressed next.

Figure 8:
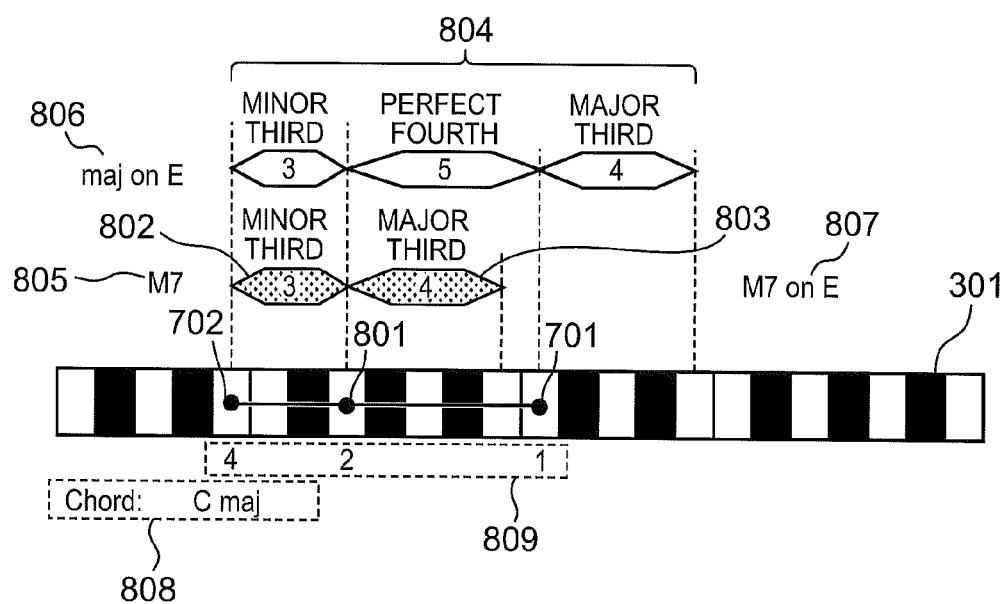
FIG. 8 is a diagram illustrating the chord-playing instruction process in the inversion mode (Part 2)

FIG. 8 shows an example of a configuration of a screen shown in the inversion mode by the chord-playing instruction device 100 connected to the electronic keyboard instrument. As in FIGS. 3 to 7, the display shows a keyboard 301 of two octaves, for example.

FIG. 8 represents a screen shown when the user presses a note "G", which has a minor-third interval (three semitones) from the bass note "E", by looking at chord types "M", "M7", "M7 on E", or "maj on E" after specifying "C" and "E" among keys of the electronic keyboard instrument in the inversion mode, in the state shown in FIG. 7. A press mark 801 is additionally shown at the position of "G" on the keyboard 301. Here, the press marks 701 and 702 are shown as in FIG. 7.

By referring to the chord information having the configuration shown in FIG. 2, the second instruction display 103 extracts, as second chord candidates, sets of chord information each including sizes of intervals "1" (major first), "3" (major third), and "5" (major fifth), or the numbers of semitones "0", "4", and "7", corresponding to the respective notes "C", "E", and "G", which have been pressed until now, based on the pressed tonic "C".

The second instruction display 103 shows a size of interval or the number of semitones from the lowest note among those that have been pressed (that is, the bass note, specifically, the note "E", which is pressed second, in this example) to the note that is pressed third, and a position corresponding to the size of interval or the number of semitones based on the position of the pressed bass note, in association with the keyboard 301.

For example, in FIG. 8, the second instruction display 103 shows a chord mark 802 indicating a minor-third interval (three semitones) from the pressed bass note "E" to the note "G", which is the third constituent note of the chord, in association with the keyboard 301.

In the inversion mode, the second instruction display 103 shows, for each of the second chord candidates, a constituent note of the chord having a size of interval or the number of semitones that is next largest to the largest interval or the largest number of semitones among those included in the second chord candidate, other than the tonic, and specified until now (the constituent note "G", which has a "major-fifth" interval or the number of semitones "7", in FIG. 8) and a chord type, in association with the keyboard 301.

In FIG. 8, the second instruction display 103 shows a chord mark 803 extending rightward by four keys corresponding to the number of semitones "4" from the position of the note "G" which is pressed third, on the keyboard 301. The second instruction display 103 shows the number of semitones "4" inside the chord mark 803, while showing the size of interval from the note which is pressed third, "major third", above the chord mark 803.

In the inversion mode, the second instruction display 103 may display, for each of the second chord candidates, the bass note (the note "E" in FIG. 8) having the size of interval or the number of semitones that is next larger than that of the tonic "C", and a chord type, in a tone range higher than the tonic "C".

In FIG. 8, the second instruction display 103 shows a chord mark extending rightward by four keys corresponding to the number of semitones "4" from the position of the tonic "C", on the keyboard 301. The second instruction display 103 shows the number of semitones "4" inside the chord mark, while showing the size of interval from the tonic, "major third", above the chord mark.

Further, as shown in a chord-mark group 804, the second instruction display 103 shows a chord mark extending from the bass note "E" to the note "G", which is pressed third (indicating a minor-third interval, three semitones), and a chord mark extending from the note "G", which is pressed third, to the tonic "C" (indicating a perfect-fourth interval, five semitones), in association with the keyboard 301.

On the basis of the chord information shown in FIG. 2, the second instruction display 103 shows a chord type 805, "M7", consisting of four notes, and a chord type 806, "maj on E", consisting of four notes, on the left side of the chord-mark group 804.

On the basis of the chord information shown in FIG. 2, the second instruction display 103 shows a chord type 807, "M7 on E", consisting of five notes, with one more note to be added after the fourth note, on the right side of the chord-mark group 804.

When a chord is formed with relationship of size of interval (the number of semitones) between three notes that have been pressed, the second instruction display 103 shows a corresponding chord name based on the current tonic, by referring to the chord information shown in FIG. 2.

For example, in FIG. 8, three pressed notes "C", "E", and "G" respectively have "major first" (zero semitone), "major third" (four semitones), and "major fifth" (seven semitones) as sizes of intervals (the numbers of semitones) based on the tonic. On the basis of the chord information shown in FIG. 2, relationship between these three notes corresponds to a chord type "maj" (that is, "X"). Since the tonic is "C", the second instruction display 103 determines that the current chord name is "C maj" (or simply "C"). Thereby, the second instruction display 103 shows a chord name 808, "Chord: C maj". In this way, the user can find out the chord name corresponding to three notes that the user has currently pressed.

When a chord is formed by three pressed notes, the second instruction display 103 may determine appropriate fingering for the chord and show a fingering instruction 809 corresponding to the determined fingering.

In FIG. 8, the second instruction display 103 shows the fingering instruction 809 indicating "4" (left ring finger), "2" (left index finger), and "1" (left thumb) corresponding respectively to three pressed notes "C", "E", and "G" on the keyboard 301.

Similarly to FIGS. 3 to 8, FIG. 9 illustrates an example of a configuration of a screen shown in the inversion mode by the chord-playing instruction device 100 connected to the electronic keyboard instrument. As in FIGS. 3 to 8, the display shows a keyboard 301 of two octaves, for example.

Figure 9:
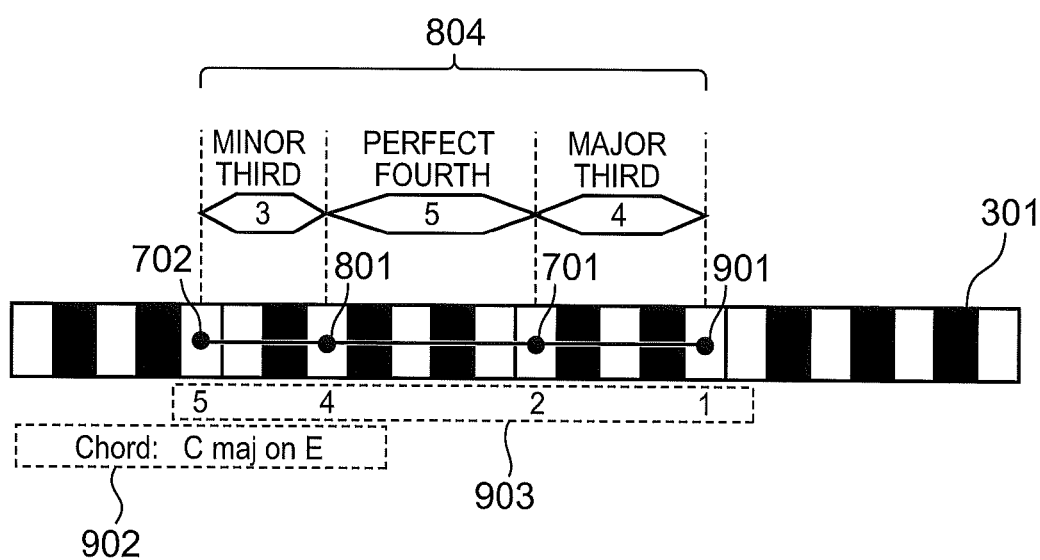
FIG. 9 is a diagram illustrating the chord-playing instruction process in the inversion mode (Part 3)

FIG. 9 shows a screen shown when the user presses a note "E" which has a major-third interval (four semitones) from the tonic and is one octave higher, by looking at the chord type "maj on E," after pressing the notes "C", "E", and "G" among keys of the electronic keyboard instrument. A press mark 901 is additionally shown at a position of "E", which is one octave higher, on the keyboard 301. Here, the press marks 701, 702, and 801 are shown as in FIG. 8.

By referring to the chord information having the configuration shown in FIG. 2, the second instruction display 103 extracts, as second chord candidates, sets of chord information each including sizes of intervals or the numbers of semitones corresponding to the respective notes "C", "E," "G", and "E", which have been specified until now, based on the pressed tonic "C".

The second instruction display 103 carries out, for example, a process for excluding chord types such as a sixth type and a ninth type, to extract a chord type "maj on E" as a second chord candidate.

The second instruction display 103 shows the chord-mark group 804 as in FIG. 8.

When a chord is formed with relationship of size of interval (the number of semitones) between four pressed notes, the second instruction display 103 shows a chord name 902 "C maj on E" based on the current tonic, by referring to the chord information shown in FIG. 2.

When a chord is formed with four pressed notes, the second instruction display 103 may determine fingering corresponding to the chord and show a fingering instruction 903 corresponding to the determined fingering.

Figure 10:
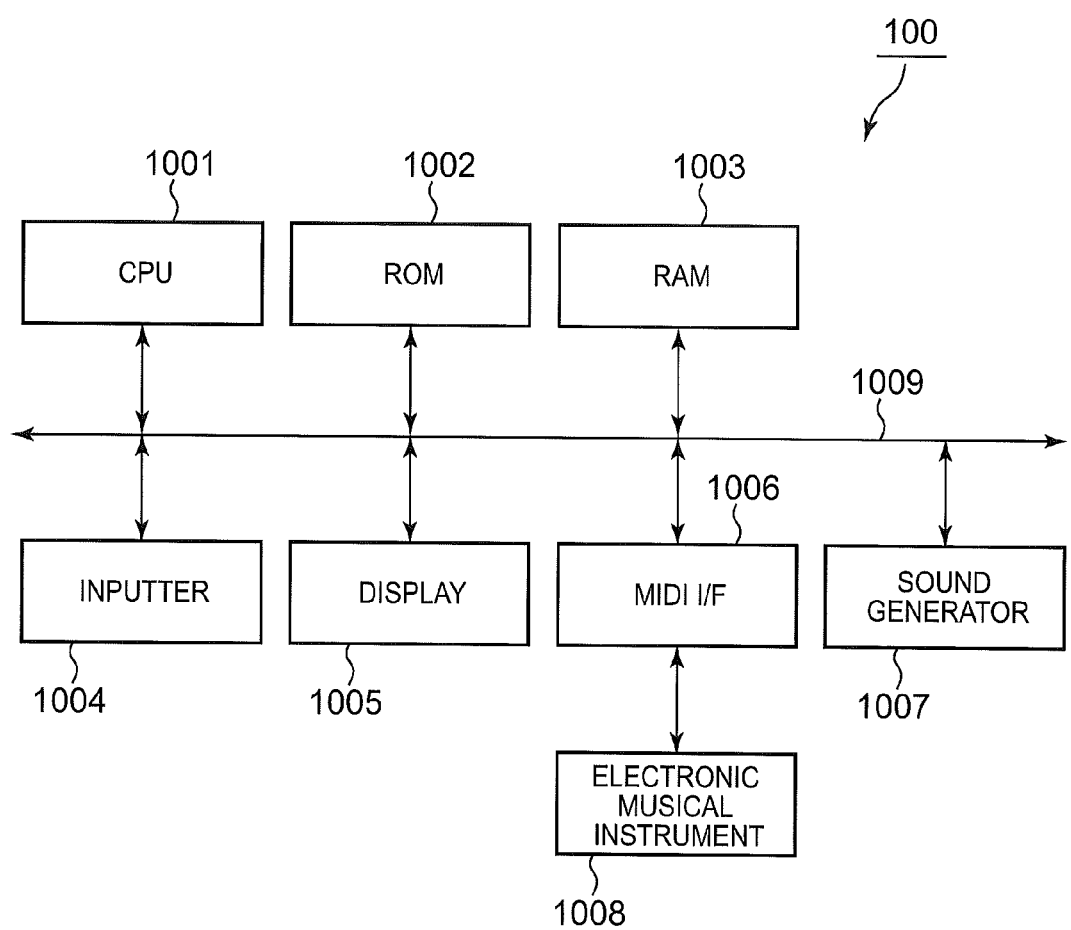
FIG. 10 is a diagram showing a hardware configuration of the chord-playing instruction device.

Next, a hardware configuration of the chord-playing instruction device 100 will be described by referring to FIG. 10.

Note data that is input to an electronic musical instrument 1008 is stored in a random access memory (RAM) 1003 via a musical instrument digital interface (MIDI I/F) 1006 and a bus 1009.

A central processing unit (CPU) 1001 executes a program stored in a read only memory (ROM) 1002 connected to the CPU 1001 via the bus 1009, and instructs a sound generator 1007 connected to the CPU 1001 via the bus 1009, to generate sound, on the basis of the note data stored in the RAM 1003.

The CPU 1001 executes a program stored in the ROM 1002, and causes a display 1005 connected to the CPU 1001 via the bus 1009, to show screens represented in FIGS. 3 to 9, on the basis of the note data that is input by the electronic musical instrument 1008, and to instruct a user to play a chord.

The ROM 1002 stores chord information shown in FIG. 2.

An inputter 1004 receives, from a user, an instruction to start or terminate a chord-playing instruction, an instruction to set a condition for initializing a buffer, which is to be described later, an instruction to select chords to be shown (for example, an instruction not to show ninth chords), and the like, and then notifies the CPU 1001 of the instructions via the bus 1009. The CPU 1001 controls the chord-playing instruction on the basis of the notification.

Figure 11:
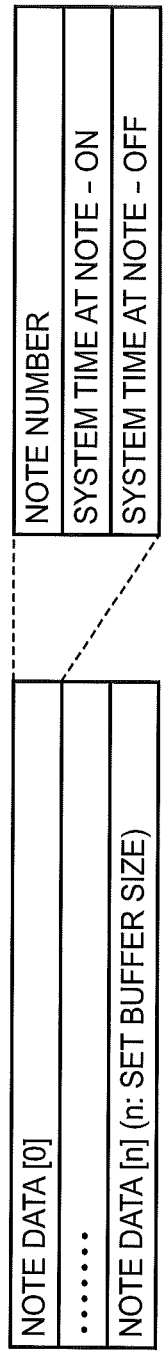
FIG. 11 is a diagram showing an example of configuration of note data stored in a note buffer.

FIG. 11 is a diagram illustrating a configuration of note data that is input by the electronic musical instrument 1008 to the RAM 1003 via the MIDI I/F 1006.

In a note buffer area of the RAM 1003, n sets (where n is an integer larger than or equal to one) of note data (that is, from note data [0] to note data [n−1]) are stored. Each set of note data includes a note number indicating a pitch, a system time at the time of note-on, and a system time at the time of note-off. The system times are timed by the CPU 1001.

Figure 12:
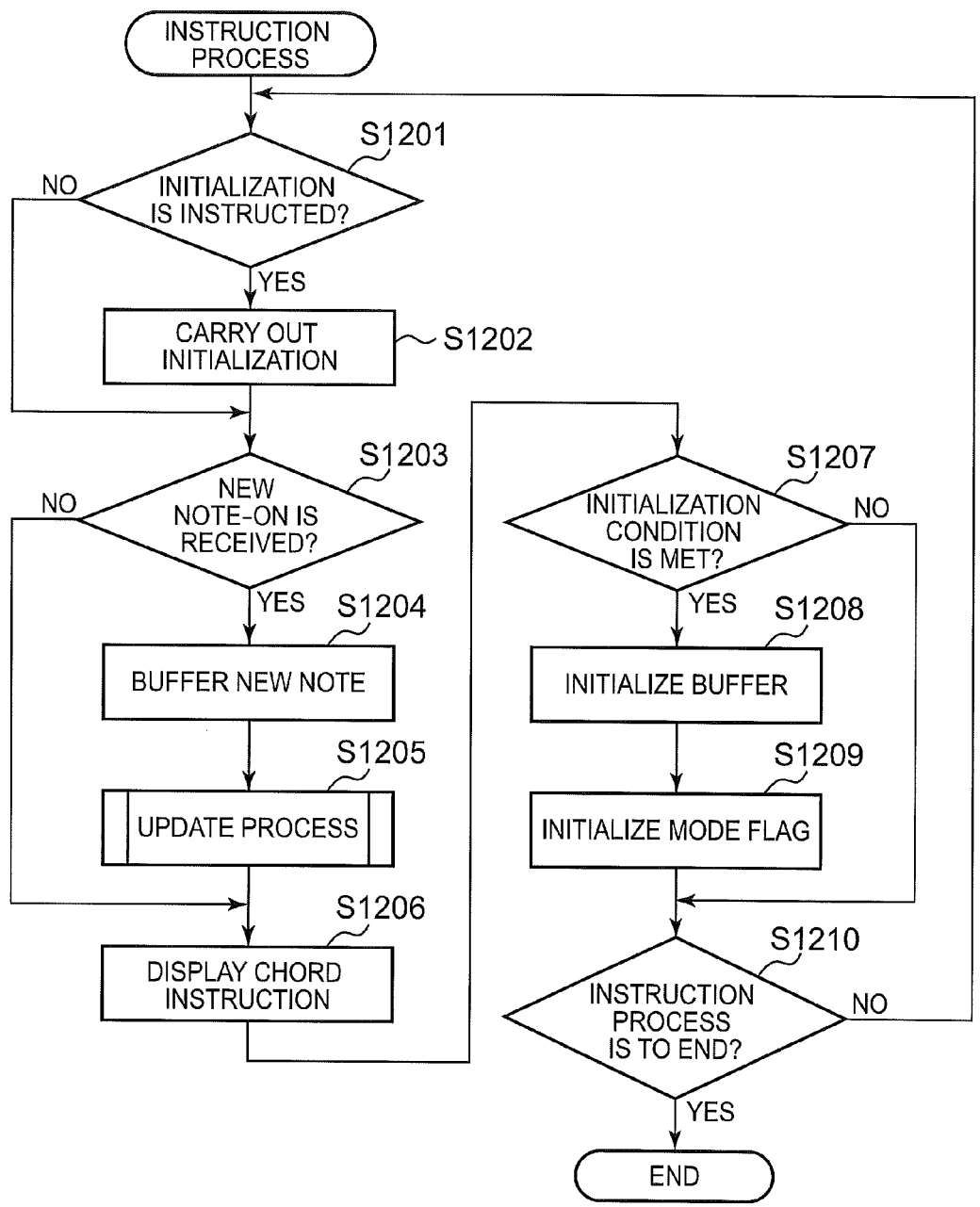
FIG. 12 is a flowchart showing the chord-playing instruction process.

FIG. 12 is a flowchart for illustrating an instruction process carried out by the CPU 1001, for instructing a user to play a chord.

First, the CPU 1001 receives, from a user, an instruction whether to carry out initialization or not (Step S1201).

Upon receipt of an instruction to carry out initialization (YES in Step S1201), the CPU 1001 carries out the initialization (Step S1202). A user inputs, by using the inputter 1004, an instruction to set a condition for initializing the note buffer area, an instruction to select chords to be shown, and the like.

When a user sets a key, the CPU 1001 may show only candidates corresponding to chords used in the key, or when a user specifies a tune to play, the CPU 1001 may show only chords used in the tune. The CPU 1001 may show chords in a mode that a user can easily distinguish between chords to be modulated and chords not to be modulated.

The CPU 1001 may have different conditions for initializing the note buffer area depending on use of a chord instruction. For example, when a chord instruction is used to play chords, the CPU 1001 may initialize the note buffer area after elapse of a certain time period with all keys being released. When a chord instruction is used to play broken chords, the CPU 1001 may initialize the note buffer area when a note that is considerably apart from the others is pressed or when a note not included in the candidates is pressed, for example.

After Step S1202, or when the CPU 1001 does not receive any instruction to carry out initialization in Step S1201 (NO in Step S1201), the CPU 1001 determines whether or not a new note-on is received (Step S1203).

When a new note-on is received (YES in Step S1203), the CPU 1001 buffers note data newly input via the MIDI I/F 1006, in the note buffer area of the RAM 1003, as new note data (note) (Step S1204).

Then, the CPU 1001 carries out an update process for updating chord instruction data (Step S1205). The update process will be described later.

After Step S1205, or when no new note-on is received (NO in Step S1203), the CPU 1001 causes the display 1005 to show a chord instruction (Step S1206), as shown in FIGS. 3 to 9.

Subsequently, the CPU 1001 determines whether or not a condition for initializing a chord-determination buffer, the condition being set in the initialization in Step S1202, is met (Step S1207).

When the initialization condition is not met, Steps S1208 and S1209 are skipped. Then, the CPU 1001 determines whether or not the user makes an instruction to terminate the instruction process, using the inputter 1004 (Step S1210).

When no instruction to terminate the instruction process is made (NO in Step S1210), the CPU 1001 returns to the operation in Step S1201 to continue the instruction process.

Upon receipt of the instruction to terminate the instruction process (YES in Step S1210), the CPU 1001 terminates the instruction process.

On the other hand, when the initialization condition is met in Step S1207 (YES in Step S1207), the CPU 1001 initializes the chord-determination buffer (Step S1208). Through this initialization, a chord-playing instruction that is currently shown is cleared. The chord-determination buffer is used in the update process to be described later.

The CPU 1001 initializes a mode flag indicating the normal mode or the inversion mode, in the RAM 1003 (Step S1209). After the initialization, the CPU 1001 advances to the above-described operation in Step S1210.

Figure 13:
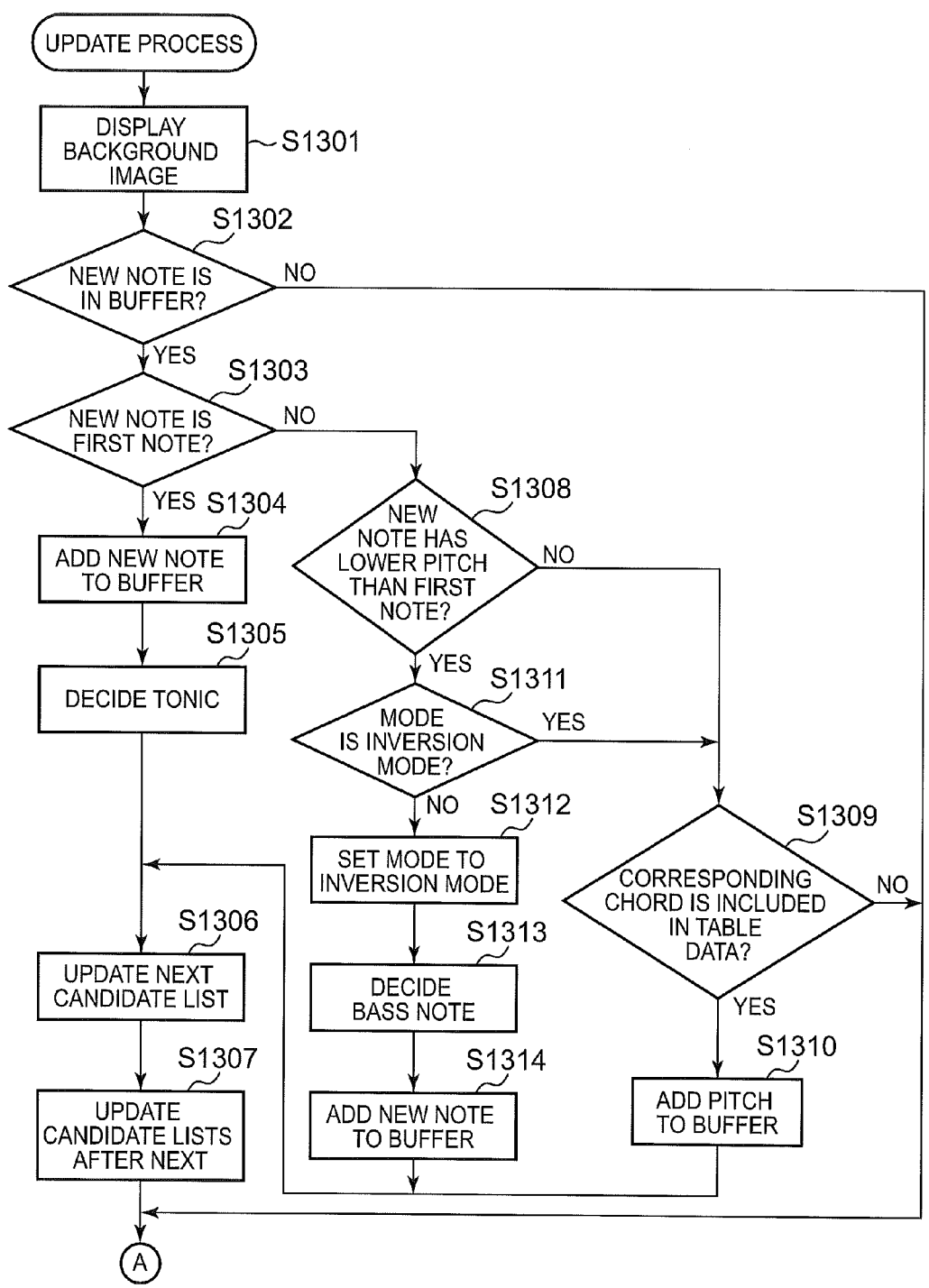
FIG. 13 is a flowchart showing an update process (Part 1)
Figure 14:
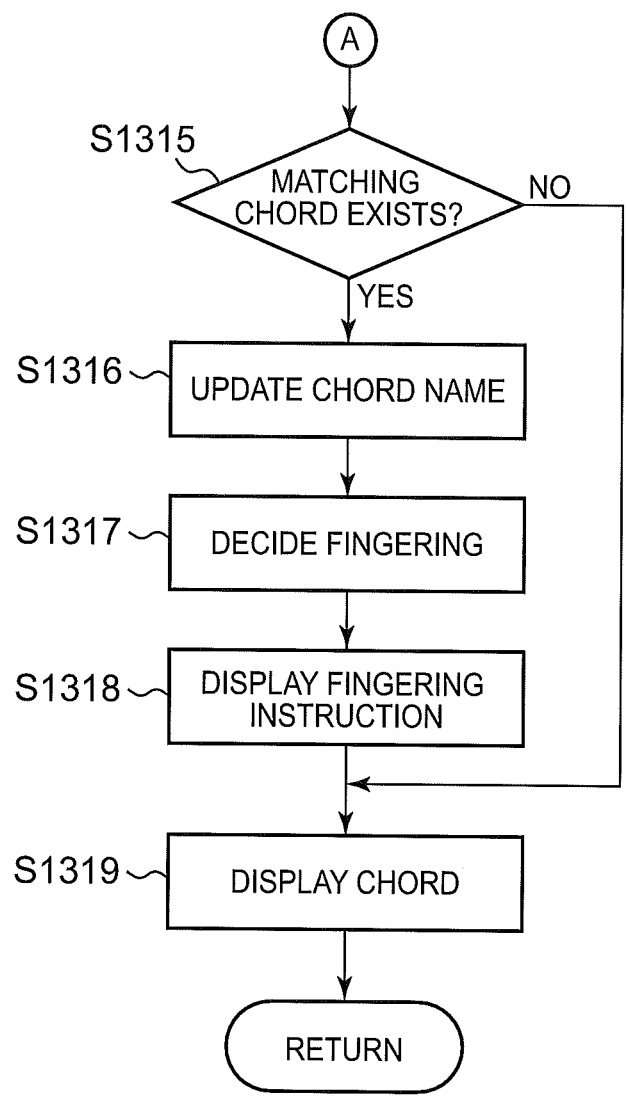
FIG. 14 is a flowchart showing the update process (Part 2).

FIGS. 13 and 14 are flowcharts showing details of the update process, which is carried out in Step S1205 in FIG. 12, for updating chord-instruction data.

First, the CPU 1001 shows a background (Step S1301). In the present embodiment, the keyboard 301 in FIGS. 3 to 9 is shown as a background image for showing a chord instruction.

The CPU 1001 determines whether or not new note data is buffered in the note buffer area in the RAM 1003 (Step S1302).

When no new note data is buffered (NO in Step S1302), the CPU 1001 advances to Step S1315 in FIG. 14.

When new note data is buffered (YES in Step S1302), the CPU 1001 determines whether or not the new note data is the first note data (Step S1303).

When the new note data is the first note data (YES in Step S1303), the CPU 1001 adds the note data to the chord-determination buffer in the RAM 1003 (Step S1304).

Then, the CPU 1001 decides a tonic on the basis of a note number included in the note data (Step S1305).

The CPU 1001 carries out an operation for updating a next candidate list (Step S1306), and then carries out the update operation for updating candidate lists after the next (Step S1307).

In the present embodiment, when the number of constituent notes that are pressed now is two (when the number of notes is one, the CPU 1001 only carries out Step S1306 without carrying out Step S1307), the CPU 1001 searches the chord information shown in FIG. 2, for chord types each consisting of only three pressed notes including a third note to be specified next, in Step S1306. Moreover, in Step S1307, the CPU 1001 searches for chord types each consisting of four or more pressed notes including one or more notes in addition to a third note to be specified next. In Step S1206 in FIG. 12 described above, the CPU 1001 classifies the chord types and shows each of the chord types in the left area 404 or the right area 405 in FIG. 4 accordingly.

After the operation in Step S1307, the CPU 1001 advances to Step S1315 in FIG. 14.

When the new note data is not the first note data in Step S1303 (NO in Step S1303), the CPU 1001 determines whether or not a pitch of the note data (note number) is lower than the tonic, which is pressed first (Step S1308).

When the pitch of the new note data is not lower than the tonic which is pressed first (NO in Step S1308), the CPU 1001 determines whether or not data indicating a chord with the pitch of the new note data in addition to the notes that have been pressed until now is included in the data stored in the chord-information storage 101 (Step S1309).

When the result of the determination in Step S1309 is YES, the CPU 1001 adds the pitch to the chord-determination buffer in the RAM 1003 (Step S1310), and thereafter advances to the above-described operation in Step S1306.

When the result of the determination in Step S1309 is NO, the CPU 1001 ignores the key press of the pitch and advances to Step S1315 in FIG. 14.

When the pitch of the new note data is lower than the tonic which is pressed first (YES in Step S1308), the CPU 1001 determines whether or not the current mode flag stored in the RAM 1003 indicates the inversion mode (Step S1311).

When the mode flag indicates the inversion mode (YES in Step S1311), the CPU 1001 advances to Step S1309.

When the mode flag does not indicate the inversion mode (NO in Step S1311), the CPU 1001 sets the mode flag stored in the RAM 1003, at a value for indicating the inversion mode, in order to set the mode to the inversion mode. Moreover, when the mode flag is initialized in Step S1209, the mode is set to the normal mode.

The CPU 1001 decides a bass note on the basis of the pitch (note) of the new note data as described in FIG. 7 (Step S1313).

Then, the CPU 1001 adds the new note data to the chord-determination buffer (Step S1314).

Thereafter, the CPU 1001 advances to the operation in Step S1306.

After the operation in Step S1307, or when no new note data is input (NO in Step S1302) or when the determination in Step S1309 is NO, the CPU 1001 advances to Step S1315.

Moving to FIG. 14, the CPU 1001 searches the chord information stored in the chord-information storage 101 for a matching chord on the basis of the sets of note data indicating the notes that have been pressed until now, and determines whether or not the matching chord is stored in the chord-information storage 101 (Step S1315).

When no matching chord is stored in the chord-information storage 101 (NO in Step S1315), the CPU 1001 advances to Step S1319.

When a matching chord is stored in the chord-information storage 101 (YES in Step S1315), the CPU 1001 updates the chord name (Step S1316), decides fingering (Step S1317), shows the fingering instruction 506 as shown in FIG. 5 (Step S1318), and then shows the chord name 505 as shown in FIG. 5 (Step S1319).

After Step S1319, the CPU 1001 terminates the update process shown in the flowchart of FIGS. 13 and 14, and also terminates the operation in Step S1205 in FIG. 12.

As described above, according to the present embodiment, even a beginner can easily play a keyboard instrument by looking at a chord sheet without any problem. In addition, a user can visually learn relationship of interval between notes constituting a chord and positions of the notes, allowing the user to easily acquire chord-playing skills.

Note that the CPU 1001 may additionally show how to read a name of each chord.

Moreover, to specify constituent notes of a chord, a user may input the notes by pressing multiple keys at the same time, or may specify the notes one by one, by pressing one key at a time in order while releasing the key before pressing a next one.

As an alternative to the input by pressing keys, a user may use, for example, a keyboard of a personal computer (PC) resembling the keyboard of a keyboard instrument, and cause the PC to show the chord on a display when notes are specified by inputting notes on the keyboard of the PC. An input device of any other type may be used instead.

The above-described embodiment is based on an assumption that notes would be input in the order from the one having the lowest pitch, with respect to the chord information shown in FIG. 2. However, a user may press keys in any order after a note that is pressed first is determined to be a tonic.

For example, if a note "G" is pressed after the tonic "C", the CPU 1001 may search the chord information shown in FIG. 2 for chords each consisting of any of notes between the notes "C" and "G", in addition to the notes "C" and "G", and show the corresponding chords, if any.

Alternatively, the CPU 1001 may search for all chord types including the tonic "C" and the note "G", and show all notes that are included in any of the chord types and are not specified yet, as candidates, irrespective of the pitch.

In the above-described embodiment, in the flowchart of FIG. 12, the CPU 1001 checks only a new note-on, and, when a new note-on is received, carries out the update process and show a chord instruction. However, the CPU 1001 is not limited to this, and may check a note-off, and, when a note-off is received for a note already pressed, carry out the update process in FIG. 13 by excluding the note that is the target of the note-off (by returning to the state including one note less), and update a screen of the chord instruction.

This enables a user to easily cancel a note that has already been pressed and try replacing the note with another note to see what happens, for example. In this way, the chord-playing instruction device 100 can provide more interactive instructions.

Moreover, the CPU 1001 may determine which note is to be excluded, on the basis of a note-off by a user, or may determine which note is to be excluded when a user presses an exclusion button to change the mode to a mode for specifying a note to be excluded.

The mode and position for showing, on the display, each chord mark corresponding to an indicator representing a size of interval, and each interval, for example, may be changed to any form.

In the above-described embodiment, an example of showing a keyboard of a piano has been described. However, the chord-playing instruction device 100 is not limited to this, and may use music-playing operators of a different type, and a different configuration of showing relationship of pitch between notes.

It is possible for an existing personal computer, information terminal device, or the like, to function as the chord-playing instruction device 100 of this embodiment, when a program for driving the chord-playing instruction device 100 is applied on the personal computer or the like.

In this case, any method can be used to distribute such a program. For example, the program may be distributed by being stored in a computer-readable recording medium such as a compact disk read-only memory (CD-ROM), a digital versatile disk (DVD), a magneto optical disk (MO), or a memory card. Alternatively, the program may be distributed via a communication network such as the Internet.

In the above, a preferable embodiment of the present invention has been described in detail. However, the present invention is not limited to the above embodiment, and different variations can be made to the embodiment within the gist of the present invention described in the scope of the claims.

What is claimed is:

1. A chord-playing instruction device comprising:
a chord-information storage for storing, for each chord type, chord-type information of a chord and relationship information indicating relationship between a plurality of constituent notes including a tonic of the chord, as a set of chord information;
a display controller for causing a display to show a plurality of music-playing operators arranged sequentially;
a first instruction display for reading out a corresponding set of chord information stored in the chord-information storage when a tonic of a chord is specified, and then causing the display to show
relationship information related to a constituent note other than the tonic, included in the read-out set of chord information,
chord-type information of the chord, and
an indicator that indicates a positional relationship between the tonic and a constituent note other than the tonic on the shown music-playing operators, based on a position of the specified tonic; and
a second instruction display for extracting a set of chord information including relationship information that matches with relationship between the specified tonic and each of all notes specified subsequently to the tonic, from the chord-information storage, when a different note is specified after specification of the tonic, and causing the display to show
relationship information related to a constituent note other than the specified notes, included in the extracted set of chord information,
chord-type information of the chord, and
an indicator that indicates a positional relationship between the tonic and a constituent note other than the specified constituent notes on the shown music-playing operators, based on a position of the specified tonic.

2. The chord-playing instruction device according to claim 1, wherein
the relationship information includes information indicating relationship of pitch between a tonic of a chord and each constituent note,
the first instruction display causes the display to show the indicator indicating a position of a constituent note that is closest in interval to the tonic among constituent notes other than the tonic, on the shown music-playing operators, for each of the read-out set of chord information, and
the second instruction display causes the display to show the indicator indicating a position of a constituent note having relationship of interval even larger than a constituent note that has the largest relationship of interval to the tonic among the specified constituent notes, on the music-playing operators, for each set of chord information including relationship information that matches with relationship between the specified tonic and each of all notes specified subsequently to the tonic.

3. The chord-playing instruction device according to claim 1, wherein
the first instruction display causes the display to show the indicator indicating the positional relationship between the tonic and a constituent note that is closest in interval to the tonic among constituent notes other than the tonic, on the music-playing operators, and
the second instruction display causes the display to show the indicator indicating the positional relationship between the tonic and each of the specified constituent notes, on the music-playing operators.

4. The chord-playing instruction device according to claim 2, wherein
the first instruction display causes the display to show the indicator indicating the positional relationship between the tonic and a constituent note that is closest in interval to the tonic among constituent notes other than the tonic, on the music-playing operators, and
the second instruction display causes the display to show the indicator indicating the positional relationship between the tonic and each of the specified constituent notes, on the music-playing operators.

5. The chord-playing instruction device according to claim 3, wherein, when the positions on the music-playing operators for the respective constituent notes of a plurality of the read-out set of chord information and/or a plurality of the extracted set of chord information are the same, the first instruction display and/or the second instruction display causes the display (i) to show only a single indicator per the same position on the music-playing operators and (ii) to show the plurality of chord information having the same position of the respective constituent note on the music-playing operators in connection with the singly shown indicator.

6. The chord-playing instruction device according to claim 4, wherein, when the positions on the music-playing operators for the respective constituent notes of a plurality of the read-out set of chord information and/or a plurality of the extracted set of chord information are the same, the first instruction display and/or the second instruction display causes the display (i) to show only a single indicator per the same position on the music-playing operators and (ii) to show the plurality of chord information having the same position of the respective constituent note on the music-playing operators in connection with the singly shown indicator.

7. The chord-playing instruction device according to claim 1, wherein
the second instruction display converts, when pitch of a note specified next to the tonic is lower than pitch of the tonic, to an inversion form with the specified note as a bass note.

8. The chord-playing instruction device according to claim 1, wherein
the second instruction display extracts the sets of chord information from the chord-information storage based on a predetermined priority order.

9. The chord-playing instruction device according to claim 1, wherein
the second instruction display causes, when a chord stored in the chord-information storage is established with the specified tonic and each of the specified constituent notes, the display to show a chord type corresponding to the established chord, as a currently-determined chord type.

10. The chord-playing instruction device according to claim 9, wherein, when a chord stored in the chord-information storage is established with the specified tonic and each of the specified constituent notes, the second instruction display (i) decides fingering corresponding to the established chord and (ii) causes the display to show a fingering instruction corresponding to the decided fingering.

11. The chord-playing instruction device according to claim 1, wherein
the display shows a keyboard including black and white keys in same size as the music-playing operators.

12. The chord-playing instruction device according to claim 1, wherein
the second instruction display causes the display to show the chord type by classifying the chord type of each of the extracted set of chord information, based on number of constituent notes indicated by a chord type included in the set of chord information.

13. A musical instrument comprises:
a chord-playing instruction device according to claim 1;
a plurality of keys for specifying the tonic and/or the constituent note; and
a display for displaying the relationship information, the chord-type information and the indicator.

14. A chord-playing instruction method comprising the steps of:
storing, for each chord type, in a memory, chord-type information of a chord and relationship information indicating relationship between a plurality of constituent notes including a tonic of the chord, as a set of chord information;
causing a display to show a plurality of music-playing operators arranged sequentially;
reading out the stored set of chord information when a tonic of a chord is specified, and then causing the display to show
relationship information related to a constituent note other than the tonic, included in the read-out set of chord information,
chord-type information of the chord, and
an indicator that indicates a positional relationship between the tonic and a constituent note other than the tonic on the shown music-playing operators, based on a position of the specified tonic; and
extracting a set of chord information including relationship information that matches with relationship between the specified tonic and each of all notes specified subsequently to the tonic, from the stored sets of chord-information, when a different note is specified after specification of the tonic, and causing the display to show
relationship information related to a constituent note other than the specified notes, included in the extracted set of chord information,
chord-type information of the chord, and
an indicator that indicates a positional relationship between the tonic and a constituent note other than the specified constituent notes on the shown music-playing operators, based on the position of the specified tonic.

15. A non-transitory recording medium that stores a program for causing a computer to execute:
a chord-information storing step of storing, for each chord type, in a memory, chord-type information of a chord and relationship information indicating relationship between a plurality of constituent notes including a tonic of the chord, as a set of chord information;
a step of causing a display to show a plurality of music-playing operators arranged sequentially;
a first instruction display step of reading out a corresponding set of chord information stored by the chord-information storing step when a tonic of a chord is specified, and then causing the display to show
relationship information related to a constituent note other than the tonic, included in the read-out set of chord information,
chord-type information of the chord, and
an indicator that indicates a positional relationship between the tonic and a constituent note other than the tonic on the shown music-playing operators, based on a position of the specified tonic; and
a second instruction display step of extracting a set of chord information including relationship information that matches with relationship between the specified tonic and each of all notes specified subsequently to the tonic, from sets of chord information stored by the chord-information storing step, when a different note is specified after specification of the tonic, and causing the display to show
relationship information related to a constituent note other than the specified notes, included in the extracted set of chord information,
chord-type information of the chord, and
an indicator that indicates a positional relationship between the tonic and a constituent note other than the specified constituent notes on the shown music-playing operators, based on a position of the specified tonic.

* * * * *